INVENTORS:
WALTER BUECHE
HUBERT KINDLER

INVENTORS:
WALTER BUECHE
HUBERT KINDLER

2,985,686
Patented May 23, 1961

2,985,686

SEPARATION OF MIXTURES IN THE PRESENCE OF A CARRIER GAS IN A CARBONYLATION REACTION

Walter Bueche and Hubert Kindler, Ludwigshafen (Rhine), Germany, assignors to Badische Anilin- & Soda-Fabrik Aktiengesellschaft, Ludwigshafen (Rhine), Germany Filed Mar. 26, 1956, Ser. No. 573,863

Claims priority, application Germany Mar. 26, 1955

5 Claims. (Cl. 260—486)

This invention relates to a process for the separation of a mixture of substances into individual components, the said process being based on transfer of materials between contacted liquid and gaseous phases. More particularly this invention relates to a process for the separation of mixtures to be carried out in the presence of a carrier gas, which is not condensable to any appreciable extent in the presence of the said mixture and at the temperature and pressure used in the process.

The conventional practice of separating vapor mixtures has been by fractional distillation especially rectification. This method comprises countercurrently contacting the vapor mixture to be separated in an exchange device with a liquid phase, which usually consists of part of the liquid obtained by condensation of the vapors after having passed the exchange device. The separation is effected by the exchange of materials between the phases and comprises partial condensation and/or partial vaporization, respectively, the vapor phase being enriched with the more volatile components of the vapor and the liquid being enriched with the less volatile components of the vapor. The mechanism of the said "exchange of materials" has already been known from the prior art. In this connection we refer to the book by E. Kirschbaum "Destillier- und Rektifiziertechnik" Second edition, 1950, pp. 92 et seq.

At any point of the exchange device, the liquid is at its boiling point, whereas the vapor phase is at its dew point. The vapors usually are generated by supplying heat to a boiler containing the mixture to be separated as a liquid, the mass velocity of the vapor stream, i.e. the quantity of gas per unit of time, being regulated by the quantity of heat supplied to the boiler. Gases not condensable at the temperature of the process will be present only occasionally and in small quantities. The presence of such gases has rather been considered to be most disadvantageous as it renders the condensation of the vapors more difficult.

This invention differs from ordinary distillation process in that said countercurrent contacting is accomplished in the very presence of a gas, not to be condensed to an appreciable extent at the temperature and pressure of the process. Moreover it differs in that the liquid phase is not at its boiling point in any part of the exchange device and in that changes of the heat contents of the carrier gas when its temperature is changed are to be taken into account. Moreover it differs in that the mass velocity of the vapors is not primarily regulated by heat transfer to the mixture to be separated but by the mass velocity of the non-condensable gas.

It is a disadvantage of the conventional distillation process heretofore described that it cannot be used if one or more of the components to be separated are liable to decompose chemically at the boiling point of the mixture which corresponds to the pressure applied to the distillation apparatus, or if they are unstable at the prevailing temperatures unless in the presence of certain gases. It is another disadvantage of the process hitherto employed that in isolating a substance produced under superatmospheric pressure in a chemical or physical treatment or reaction, the mixture containing the substance to be isolated first has to be removed from the pressure apparatus, released from pressure and then processed separately, for example by a multistage distillation process with some of the separated components having possibly to be fed back to the pressure apparatus with the consequent requirement for additional pumps. In the case of such a multistage process it is inevitable that part of the liquid substances and of the gases dissolved therein should be lost. Moreover, the danger of inflammable or toxic substances escaping into the open air is increased as the number of manipulations increases. When exothermic-chemical reactions are carried out a preferred manner of operation provides removing the heat liberated by the passage through the reaction chamber of a gas which is saturated therein with the vapors of the materials present. These vapors are then caused to settle out again from the gas in a condenser. The heat withdrawn from the reaction chamber during the evaporation is carried away by the gas and finally discharged in the condenser. In the usual case the gas is repeatedly passed through the reaction chamber in a cyclic fashion. This technique has the shortcoming that not only is it impossible to utilize the reaction heat liberated, but that additional costs are involved to discharge it.

In contrast to this prior art practice, this invention provides a process for the separation of mixtures of substances by the transfer of materials between a vapor-laden carrier gas and a liquid which can be carried out at temperatures lower than the boiling points of such mixtures. Moreover, it allows of operating in the presence of gases which may counteract the chemical decomposition of the substances to be separated. Moreover, our process may be accomplished in direct connection with a preceding treatment, without release of pressure and/or conveyance to another apparatus, thus avoiding the disadvantage outlined above. If the said treatment is an exothermic reaction, the heat disengaged is utilized in our process of separation, whereas in the procedures hitherto employed its withdrawal usually has caused additional costs.

One object of this invention is to provide a process for the separation of mixtures of substances in the presence of a carrier gas not condensable to an appreciable extent in the presence of said mixture and at the temperature and the pressure prevailing in the process, by the transfer of materials from a gaseous phase to a liquid phase and vice versa.

Another object is to provide a process for the separation of liquid or solid mixtures by countercurrent exchange of material between a gaseous phase and a liquid phase at temperatures lower than the temperature at which the vapor pressure of the mixture equals the pressure at which the process is carried out, i.e., lower than the boiling point or sublimation point of said mixture.

A further object is to provide a separation process which is practicable in the presence of gases suitable to prevent decomposition of the substances to be separated.

Still another object is to provide a separation process which is practicable under the pressure of a preceding process of physical or chemical treatment, thus avoiding losses and dangers connected with the release of pressure and the transfer of the products to another apparatus, and saving costs for energy and additional pumps for the backfeed of some of the substances isolated.

A still further object is to provide a separation process which utilizes the reaction heat of a foregoing exothermic treatment for the separation of substances.

An additional object is to provide a separation process which utilizes the fact that the partial vapor pressures of the constituents of a liquid mixture are altered, normally increased to an extent which is specific to each constituent under the thermodynamic influence of a non-condensable gas present at a high partial pressure of, e.g. more than 50 atmospheres, preferably 200 to 1000 atmospheres or more, thus in suitable cases shifting the thermodynamic equilibrium to more favorable positions.

Other objects will appear from the detailed description hereinafter.

To achieve the said objects our invention provides a new and efficient method which is generally applicable to the separation of mixtures and more specifically comprises mixing all or part of the mixture to be separated in vapor form with a gas, not condensable to an appreciable extent in the presence of said mixture and at the temperature and pressure used in the process, counter-currently contacting the vapor-laden gas with part of the mixture to be separated or with any other suitable liquid for the fractional transfer of substances therebetween, whereby at least a portion of the vapors is condensed and/or a portion of the liquid is evaporated so that as a result the gaseous phase is enriched with the more volatile components of the said mixture to be separated and the liquid phase is enriched with the less volatile components, removing the less volatile components in a condensed form and removing the more volatile components in vapor form together with the gas, then, if desired, condensing the vapors enriched with the more volatile components to separate them from the gas and, as the case may be, counter-currently contacting one or more of the fractions enriched with the less volatile or with the more volatile components of the said mixture separately with a gaseous phase in other exchange devices, in substantially the same manner as described heretofore.

The invention will be more readily understood from the following detailed description when taken in connection with the accompanying drawings wherein four preferred embodiments of the invention are diagrammatically depicted. In these drawings.

Figure 1:
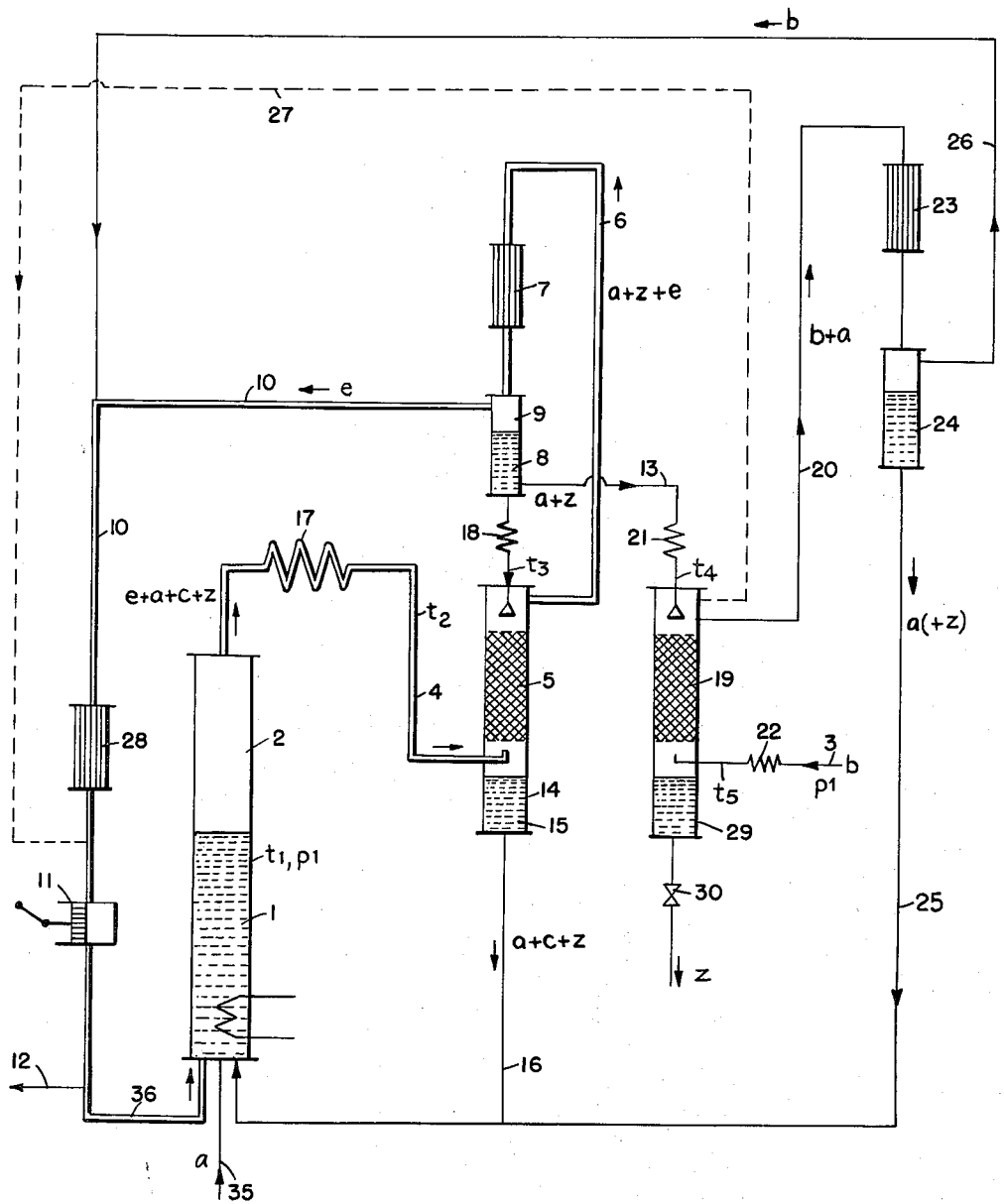
Fig. 1 illustrates our invention in a general aspect.

The mixture of substances to be separated may be either gaseous, liquid, or solid. It may respectively, be mixed with or evaporated into, a carrier gas in a contacting or treatment chamber. In this contacting chamber, the gas may be either passed through the sump phase, or be contacted with the mixture moving in countercurrent or cocurrent flow with the gas, or be contacted by any other means. The constituents of a liquid or solid mixture will vaporize proportionate to their partial vapor pressure, the gas thus generally containing the vapors of each of the components. This contacting chamber need not be a device of its own. The said process can also take place in a special zone of the exchange device. This zone need not even be spatially apart from the zone in which the exchange process (transfer of materials) occurs. The evaporation and/or the mixing of the materials to be separated and the separation of the said materials into their components may thus either wholly or partly coincide locally and temporally.

Said treatment may be accomplished at any suitable pressure and temperature. As the components of the mixture are not at their boiling points, the temperature of the process need not be chosen between narrow limits. The temperature is advantageously so chosen that the vapor pressure of the mixture to be separated attains an appropriate value. The pressure may come up to atmospheric pressure. However, it may also be higher, say up to more than 1000 atmospheres. In certain cases it may also be advantageous to use a pressure lower than atmospheric pressure. The temperature and the pressure prevailing in the contacting chamber are advantageously so chosen that a favorable ratio between the quantities of vapor and the quantities of gas is set up. We shall deal with this fact in greater detail elsewhere. This ratio between the vapor and gas quantities may be changed yet when the mixture has left the contacting chamber by the admixture of further amounts of gas. This invention affords the special advantage that the contacting chamber can also be used for carrying out processes other than evaporation processes, for example chemical reactions in which the said carrier gas may possibly be required. In such a case, the temperature and pressure of the vaporization will be such as to be suitable for said reaction. In order to maintain a constant temperature in the contacting chamber, it may be necessary to heat or cool its contents depending on the amount of heat consumed for heating and saturating the gas as compared with the heat set free in the treatment. Anyway, this heat of reaction is utilized for the separation of substances, whereas in the procedures employed hitherto it was lost, and in the usual case with additional expense for withdrawing the heat.

The countercurrent transfer of materials between vapor-laden gas and a liquid can be accomplished in any suitable device, for example in a bubble-plate distillation column or in a packed distillation column. The pressure and the temperature applied to that exchange device is not restricted to narrow limits. Preferably the pressure and the temperature adopted are about the same as in the initial contacting chamber. In special cases it may also be advantageous to change the pressure and/or the temperature of the gas-vapor mixture when this has left the contacting chamber but not yet entered the exchange device. The temperature of either the gaseous or the liquid phase may be changed by supplying or removing heat by means of preheaters as well as in the exchange device itself. As a result, the temperature in the exchange device may be freely chosen in its height and locally changed at will. A suitable choice of the exchange temperature may influence the position of the thermodynamic equilibrium in a favorable way, especially when azeotropic mixtures of the substances to be separated exist.

Preferably the process in accordance with our invention is intended for a continuous separation of materials. It is understood, however, that the process can also be used for the separation of materials in a discontinuous manner.

The liquid brought into contact with the vapors within the exchange device may be a part of the condensate, obtained upon partial condensation or part of the condensate obtained upon complete condensation of the vapors from the carrier gas after the vapors have passed the exchange device. However, any other liquid suitable for this purpose may also be used, for example a liquid required in the reaction zone as a starting material, or a liquid with a lower vapor pressure and a high solvent power for some of the constituents of the mixture.

The separation of the vapors from the carrier gas to form a liquid or a solid phase, hereinafter briefly termed "condensation" may be effected by any suitable means, for example by cooling or by absorption. It may comprise total separation of all of the vapors in one step. Condensation may also be accomplished in several stages following each other, thus obtaining a further enrichment of the more volatile components in the last portions of the condensate. It may be desirable to condense only a part of the vapors contained in the gas, whereas the other part together with the gas may either be put to use in an application outside this process or may be recycled to any suitable point of this process, for example recycled to the contacting or treatment chamber. In particular, it may be advantageous to condense only such an amount of the vapors as will be used for forming the reflux liquid in the exchange device. It may be favorable to subject the condensate or the liquid enriched with the more volatile components of the mixture or one or several separate liquid phases thereof to a separation process, which is substantially the same as the one herein-before described, in separate contacting chambers and exchange devices. These exchange devices need not, however, be spatially apart from the first exchange device, but may be a certain section of the latter. For example these liquid fractions may be conducted countercurrent to a gas which may be all or a part of the carrier gas after the total or partial condensation of the vapors, or it may be the fresh gas supplied to the process. In said separate exchange devices, the most volatile components of said fractions of the condensate are vaporized into the gas and enriched by exchange of materials between the two phases flowing in countercurrent. The vaporized substances contained in this stream of gas may or may not be settled from the gas after leaving the exchange column.

The heat required for evaporating a part of the liquid mixture may be covered by the heat content of the liquid and/or the gas with accompanying temperature decrease, or it may be transferred to the materials in the column itself by suitable means.

In the practice of our invention, we use any substance as the medium referred to in this specification as a "non-condensable gas," a "carrier gas" or a "gas," which will not, due to its dew point, undergo condensation in any appreciable amount at the pressure and the temperature prevailing in the process and in the presence of the other substances involved. By way of example, the carrier gas or a component thereof may be a type of gas which by its presence prevents chemical decomposition of one or more of the substances to be separated, it may be an inert gas, or it may be or include a gas which participates in a chemical reaction which takes place in the initial contacting or treatment zone.

The process can be practiced at any pressure, i.e. at pressures inferior to one atmosphere and at high pressures. Any ratio between the quantity of vapor and the quantity of the carrier gas is permissible, the ratio commonly used being 0.2 to 100 parts of carrier gas to one part by volume of the vapor-gas mixture to be separated. Special advantage is afforded by a ratio of 0.5 to 20 parts of carrier gas to one part of the vapor-gas mixture.

After condensation of the vapors, the gas may partly or completely be recycled to any point of the process, for example to the contacting chamber at the pressure of the process, thus requiring circulatory devices of small pressure rise only, since merely the resistance of flow within the circulation has to be overcome. The gas or part of it, for example gaseous reaction products, may be discarded or recovered separately, and fresh gas, for example those components of the gas consumed in the reaction zone, may be supplied to circulating gas.

It may be advantageous to recycle one or more of the fractions of the condensate to the contacting or treatment chamber, for example those fractions which contain constituents of the catalyst, solvents or the like.

The substances constituting either the feed stock to the contacting chamber or one of the fractions obtained in carrying out the separation process may be insoluble in each other or have only limited solubility thus forming two or more condensed phases. In this case, it may be good practice to separate the individual phases from one another and to conduct each of them separately to a suitable point of the process or to remove it from the system.

By giving the contacting chamber, the exchange devices and the condensers suitable relative heights the liquids may be caused to recycle under the influence of gravity so that no mechanical means are required to convey all or most of the liquid fractions to any desired point of the process.

By adequate combination of some individual steps described above, mixtures of any number of constituents can be separated into any number of fractions, which are either pure substances, azeotropic mixtures or mixtures of two or more components, the separation of which is possible but not desirable. In particular, in order to save costs for energy, it will be advantageous to separate the primary mixture only sufficiently to purify the components required in pure form, whereas the accompanying materials are recycled in combined fractions. This is especially true of starting materials, catalysts, solvents, and the like, when a chemical reaction takes place in the contacting chamber.

Our invention will now be described in greater detail in the following Examples 1 to 4 taken in connection with Figs. 1 to 3 of the accompanying drawing respectively.

*Example 1*

Figure 2:
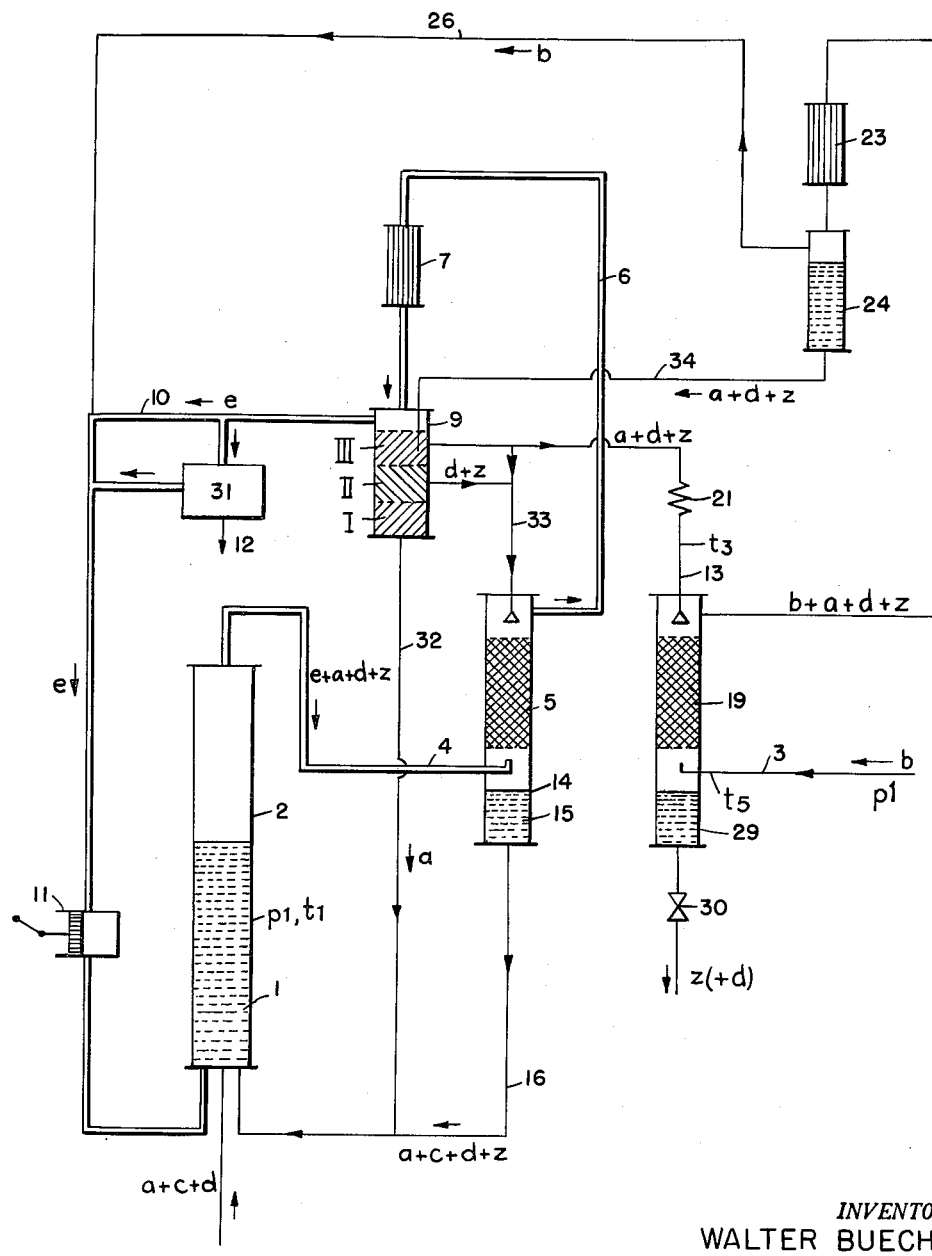
Fig. 2 illustrates our invention as applied to the synthesis of butanol from water, propylene and carbon monoxide in the presence of N-n-butylpyrrolidine and iron pentacarbonyl, and the subsequent purification of the butanol produced.

Referring to Fig. 1 2 denotes a contacting or treatment chamber in which a temperature $t_1$ and a pressure $p_1$ are maintained. The said contacting chamber 2 contains an initial liquid mixture 1 including a feed stock composed of a solvent $c$ and a liquid starting material $a$ fed in through line 35. Also present with the feed stock is a liquid product $z$ formed by the reaction between the material $a$ and a gas $b$. The gas $b$ is furnished as a component of a gas mixture $e$ which enters the contacting chamber 2 through line 36, passes to column 5 through line 4, thence to condenser 7 through line 6, to separator 9, through line 10 and back again in a cycle to the contacting chamber 2 through line 36 by the action of a pressure rise effected by a gas pump 11. The path which gas $e$ travels in a cyclic fashion is indicated in Fig. 1 by a double line. The amount of the fresh gas $b$ consumed in the reaction is re-furnished to the circulation gas $e$ through line 26, passing from line 3 through column 19, line 20, condenser 23, and separator 24.

In the practice of our invention embodied in this example, the material $a$ is understood to have a lower boiling point than the product $z$ which in turn has a lower boiling point than the solvent $c$ at the prevailing pressure $p_1$. Desirably, the three components $a$, $c$ and $z$ forming the initial liquid mixture or solution 1 shall be miscible with one another independently of their relative proportions. Furthermore, they do not have an azeotropic point.

The circulating gas stream $e$ is loaded with the vapors of the three components $a$, $c$ and $z$ in the contacting or treatment chamber 2. It passes trough a pipe 4 to the contacting column 5 in which the higher boiling constituent $c$ is separated from the vaporous mixture contained in the gas stream $e$ by an exchange of materials in countercurrent flow between the said vapor carrying gas stream and a liquid reflux which trickles down in the column. As a result, the gas no longer contains any constituent $c$ at the top of the column 5. The gas then passes through a line 6 to a condenser 7 in which the components $a$ and $z$ are condensed to form a liquid 8 which is separated from the carrier gas in the separator 9. The gas $e$ recycles into the contacting chamber 2 by way of the line 10. Gaseous by-products are removed in a current of off-gas discharged through line 12.

The liquid mixture 8 in the separator 9 solely contains the components $a$ and $z$. By suitably choosing the mass velocity of the carrier gas, it can be achieved that the rate of removal from the contacting chamber 2 of the substance z in the gaseous phase is higher than the rate of its formation, so that after removal through pipe 13 of an amount of the mixture 8 containing the quantity of z actually formed there remains another part of said mixture which is fed back into the head of column 5 as functioning reflux in the manner above referred to.

In the sump of the column 5 a liquid 15 is collected containing all of substance c which has been transferred to the exchange column by the carrier gas e together with the fractions of the more volatile components a and z, which exceed the quantity of a and z, respectively, removed through pipe 13. The liquid 15 flows back to the contacting chamber 2 through line 16 by hydrostatic pressure, corresponding to a difference in the levels of the liquids 1 and 15. The reflux ratio in the exchange column 5 may be regulated by the velocity of the circulating gas stream e, with a larger amount of gas conveying more vapors and therefore as a result yielding more condensate 8 which is available to be recycled to the head of column 5. The reflux ratio may also be influenced by a change of the temperatures $t_2$ and $t_3$ of the gas and of the refluxing liquid, respectively, by means of the preheaters 17 and 18, respectively.

The liquid removed from the separator 9 through line 13 is conducted to the head of a second exchange column 19, where it is treated in counter-current with the fresh gas b which is required to replenish the circulating gas, the fresh gas being introduced into column 19 through line 3. The pressure in this second exchange column 19 is much the same as in the reaction chamber 2. The gas absorbs a fraction of the liquid in vapor form, the said liquid on passing through column 19 being enriched with the lower boiling components which contains the starting material a and a small part of the end product z. The amount of substance removed in vapor form depends on the quantity of gas flowing through column 19, and on the temperature of the vapor-containing gas leaving the column 19 through line 20. This temperature is controlled by the temperatures $t_4$ and $t_5$ of the liquid and gas fed in, which in turn may be regulated by the preheaters 21 and 22, respectively. The vapor-laden gas is conducted by way of line 20 to the condenser 23, the liquid obtained on condensation of the vapors therein being separated from the gas in the separator 24, whence the condensate returns to the contacting chamber 2 through line 25. The gas is combined with the circulating gas e by way of line 26.

As an alternative to the procedure described in the foregoing paragraph the hot gas leaving column 19 is combined with the circulating gas through line 27 (indicated by a broken line) without previous condensation of the vapors, if provision is made for the temperature of the mixture of the combined gases to lie above the dewpoint of the vapors contained therein, even at the higher pressure effected by the pump 11, to avoid partial condensation which interferes with the action of pump 11. It may be necessary to heat up the gas in the preheater 28.

The reaction product z, having been stripped of the more volatile component a, is collected in the sump 29 and released from pressure through valve 30; it is removed from the apparatus in a pure form, all other substances being recycled.

The operational process illustrated by Fig. 1 is appropriately varied when, in contrast thereto, the component of the lowest or highest boiling point is to be recovered in pure state, or when the circulating gas entrains more than three substances in vapor phase from the contacting chamber.

*Example 2*

This example, with reference to Fig. 2, describes the synthesis of butanol from water, propylene, and carbon monoxide with the latter two forming the fresh gas b. The reaction is conducted in the presence of N-n-butylpyrrolidine and iron pentacarbonyl, both acting as a catalyst and a solvent. The normal boiling temperatures (at a pressure of 1 atmosphere) of the pure liquids are as follows:

|  | B.P., °C. |
|---|---|
| Water (substance d) | 100 |
| Iron pentacarbonyl (substance a) | 102 |
| n-Butanol (substance z) | 117 |
| N-n-butylpyrrolidine (substance c) | 157 |

The reaction is carried out in a reactor 2 of 100 litres capacity in the sump phase 1 at a pressure $p_1=10$ atmospheres and $t_1=110°$ C. 4.2 kilograms of butanol are formed per hour.

In order to carry out the process, about 5 cubic metres per hour of fresh gas b are required. About 90 cubic metres per hour of circulating gas e containing the fresh fresh gas b and by-products are passed through the reactor 2. The circulating gas e, promoted by the pressure rise of a pump 11, is conducted from the reactor 2 through line 4 to the exchange column 5, whence it passes to the condenser 7 through line 6, and is recycled through conduit 10 to pump 11. The carbon dioxide formed in the reaction as a by-product and contained in the circulating gas e is removed from a branched stream in a separate apparatus 31, which it leaves through line 12. In the reactor 2, the circulating gas absorbs the following amounts of the initial liquid mixture 1 in vapor form:

Substance c: 2.6 kilograms per hour of butyl pyrrolidine (20.5 mols),
Substance z: 8.6 kilograms per hour of butanol (116 mols),
Substance d: 6.3 kilograms per hour of water (350 mols), and
Substance a: 14.1 kilograms per hour of iron pentacarbonyl (72 mols).

In the exchange column 5 being 200 millimetres in diameter and 5,000 millimetres in height and filled with Raschig rings a pressure of about 10 atmospheres is maintained. The gas-vapor mixture is completely freed from butyl pyrrolidine by an exchange of materials between the vapors contained in the gas and the reflux liquid that trickles down in the column 5. Then the gas is cooled to 30° C. in the condenser 7. The condensate thus formed separates in the separator 9, forming three layers I, II and III, which contain the amounts of substances (in kilograms per hour) set out in the following tabulation:

| Layer | I | II | III |
|---|---|---|---|
| substance a (carbonyl) | 13.4 | trace | 2.7 |
| substance d (water) | trace | 4.7 | 1.9 |
| substance z (butanol) | trace | 0.3 | 8.7 |

The substances collected in layer I flow back through line 32 directly to the reactor 2. The substances contained in layer II and half of the layer III flow to the head of column 5 through line 33. They serve as a reflux contacting the circulating gas in column 5. From the sump 14 of column 5, 2.6 kilograms of butylpyrrolidine, 4.1 kilograms of butanol, 5.5 kilograms of water and 0.7 kilogram of carbonyl flow hourly through conduit 16 back to the reactor 2.

The second half of the substances collected in the layer III is heated in preheater 21 and supplied through line 13 to the top of the fresh gas column 19. A part of the liquid is evaporated into fresh gas b entering at a pressure of about 10 atmospheres through line 3; by exchange of materials the most volatile component is enriched in the gaseous phase. It is composed of 82% iron pentacarbonyl
9% butanol
9% water which is the composition of an azeotropic mixture. In order to transfer into the gas 1.35 kg. of iron pentacarbonyl contained in the liquid fed into column 19, together with 0.15 kg. of butanol and 0.15 kg. of water, the temperature of the gas-vapor mixture is to be maintained at 70° C. These vapors are condensed in the condenser 23, the liquid being recycled after separation from the gas in separator 24, to separator 9 through line 34. The gas b is combined with the circulating gas e through line 26.

From the sump 29 of the exchange column 19, the 4.2 kilograms of butanol hourly formed in the reactor 2 can be withdrawn through valve 30 in admixture with 0.8 kilogram of water but without any other components.

In the reactor 2, 558.5 mols of substances per hour must be evaporated into the circulating gas for which about 5,500 kilogram-calories of heat are required per hour. During the reaction, a reaction heat of 57.3 kilogram-calories per mol of butanol are set free, i.e. 3,250 kilogram-calories per hour. 2,250 kilogram-calories have to be supplied to the treatment chamber from outside. Thus, by working in the manner described, about 60% of the heat required for the separation are furnished by the heat of reaction.

*Example 3*

Figure 3:
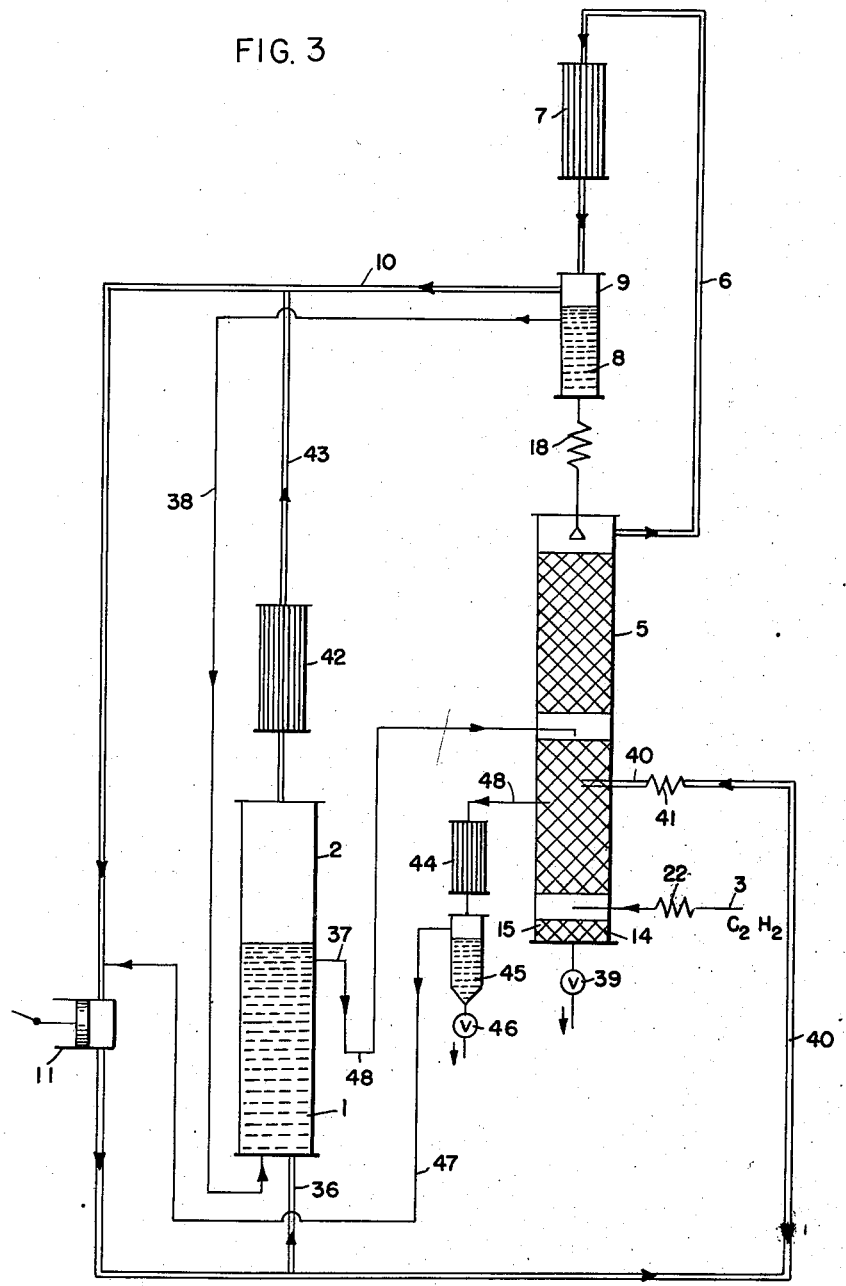
Fig. 3 illustrates our invention as applied to the synthesis of cyclooctatetraene from acetylene and the isolation of the cyclooctatetraene produced.

This example, with reference to Fig. 3, is for the synthesis of cyclooctatetraene from acetylene and the isolation thereof, i.e. for an embodiment of our invention in which a mixture of substances enters the exchange device in a liquid state. The synthesis is carried out at a pressure of 15 atmospheres and a temperature of 100° C.

Referring to Fig. 3, 5 kilograms of the liquid reaction mixture 1 which contains 1.0 kilogram of cyclooctatetraene, 1.0 kilogram of benzene and 3.0 kilograms of tetrahydrofuran are fed from the reaction chamber 2 of the system through line 37 and the siphon 48 into the middle part of column 5 charged with Raschig rings. The fresh gas (acetylene) required for the formation of 1 kilogram of cyclooctatetraene is fed into column 5 at the lower end thereof through line 3 and preheater 22 with a temperature of 120° C. at a rate of 1.7 cubic meters an hour (N.T.P.). Also fed into column 5 are 6.8 cubic meters (N.T.P.) of a circulation gas of 120° C. through line 40 and preheater 41. These two gases passing upwards to the column head are fed through line 6 to the condenser 7 and the separator 9 in which the stripped-off liquid is separated from the gas, this passing through line 10 to the gas pump 11 and back to the column 5 through line 40. Another part of the circulation gas passes from pump 11 through line 36 to the reaction chamber 2, thence back also to pump 11 via a dephlegmator 42 through line 43. This partial stream serves for the discharge of the reaction heat from the reaction chamber 2. In this particular case, the reaction heat is not utilized for the separation of materials, as the gas absorbs but very small quantities of the cyclooctatetraene to be isolated in the reaction chamber 2.

In the column 5 the liquid effluent 15 which collects in the sump 14 is stripped of the lower boiling fractions by the exchange of materials method so that 0.98 kg./h. of cyclooctatetraene can be withdrawn from column 5 in pure form through valve 39. A partial stream of 0.6 C.B.M. (N.T.P.) of the gas-vapor mixture is passed through line 48 to a condenser 44 and thence to a separator 45, from which the gas, after having been stripped of the vapors, is cycled back to the pump 11 through line 47. This partial stream, on leaving the column 5, carries with it 20 g./h. of benzene formed as a by-product and 20 g./h. of cyclooctatetraene and these two substances are discharged in a liquid form through valve 46.

In the top part of column 5 the carrier gas contains 1.64 kg./h. of benzene and 5.0 kg./h. of tetrahydrofuran in vapor form which both, after having passed the condenser 7 collect in the separator 9 as a liquid 8. Two-fifths of the quantity of this liquid are heated to 110° C. in a preheater 18 and refed into column 5 as a reflux, while three-fifths of liquid 8, i.e. 0.98 kg./h. of benzene and 3.0 kg./h. of tetrahydrofuran are passed back to the reaction chamber 2 through line 38. The quantity of heat required for the evaporation of the materials which pass into the gas phase in the column 5 is supplied in conventional manner.

There is thus no loss in solvents in the cyclic type process according to our invention. Only the products formed during the operation, i.e. 1.0 kg./h. of cyclooctatetraene and 20 g./h. of benzene, are removed from the apparatus.

*Example 4*

Figure 4:
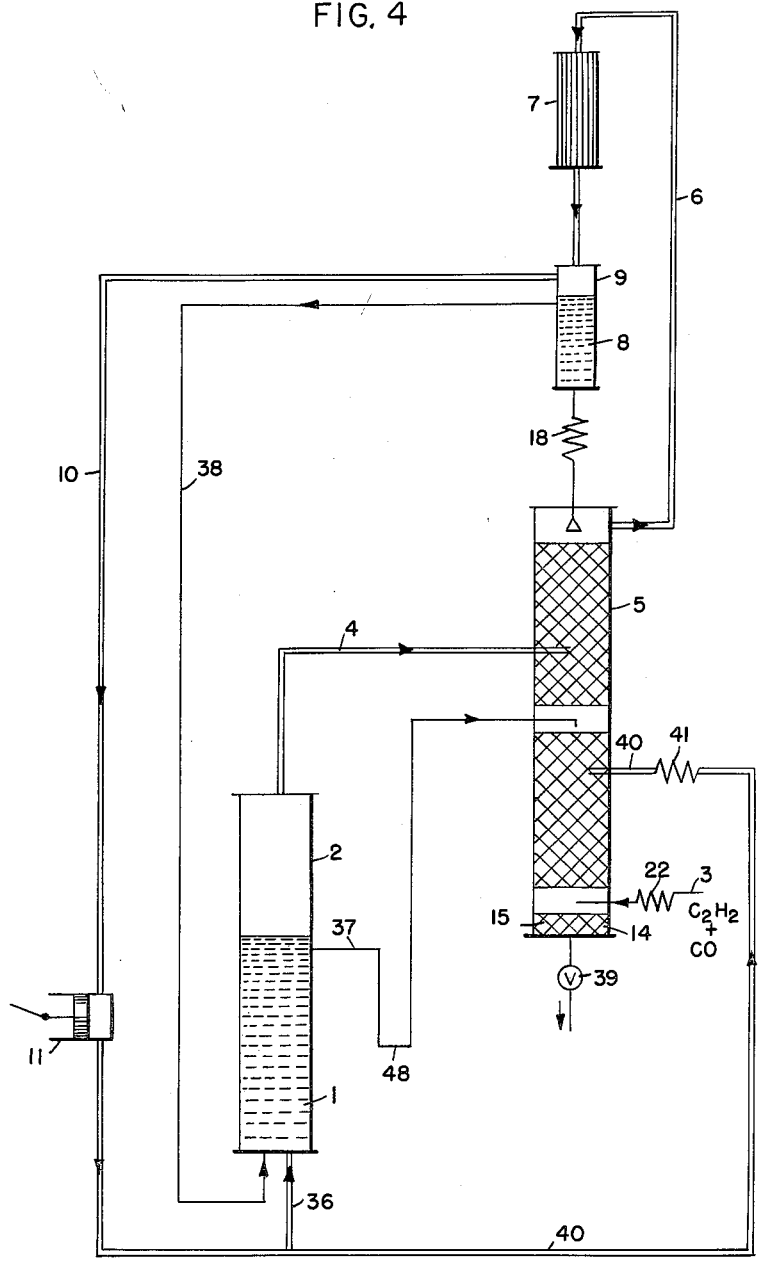
Fig. 4 illustrates our invention as applied to a method of processing a crude butyl acrylate product in direct conjunction with the synthesis thereof.

This example, with reference to Fig. 4, is for the method of processing a crude butylacrylate product in direct conjunction with the synthesis thereof. In this example the substance to be isolated is charged in the exchange device partly in a liquid phase and partly in vapor form. The formation of butyl acrylate from acetylene, carbon monoxide and butanol in the presence of acetone as a solvent occurs in the reaction chamber 2 in the liquid reaction solution 1 at a pressure of 50 atmospheres and a temperature of 175° C. 2.74 kg. of solution 1 per hour, containing 1.15 kg. of acetone, 0.72 kg. of butanol, 0.72 kg. of butyl acrylate and 0.15 kg. of a difficultly volatile oil, pass through line 37 and the siphon 48 and enter into the middle part of column 5. For discharging the reaction heat 1.75 cubic meters (N.T.P.) of a mixture of acetylene and carbon monoxide are passed through the reaction chamber 2 per hour, the gas mixture carrying away with it 1.55 kg./h. of acetone, 0.33 kg./h. of butanol and 0.28 kg./h. of butyl acrylate. This gas-vapor mixture is fed into column 5 through line 4 above line 37. From column 5 the gas flows on to the condenser 7 through line 6, thence to the separator 9 and back through line 10 to pump 11 and thence to the reaction chamber 2 through line 36. A partial stream of the circulation gas (2.95 cubic meters an hour (N.T.P.)) is passed from pump 11 through line 40 and preheater 41 to column 5 and combines therein with the gas stream led through the reaction chamber 2. The amount of fresh gas (0.35 cubic meter per hour (N.T.P.)) required for the synthesis and consisting of equal parts (by volume) of carbon monoxide and acetylene, is fed into the lower part of column 5 through line 3 and preheater 22. The temperature of the column is kept at 175° C. by the supply of heat.

In the column 5 the bulk of the readily volatile fractions is stripped off from the butyl acrylate by the exchange of materials between the two counter-flow phases. In the sump 14 of column 5 a solution 15 hourly collects which consists of 1.0 kg. of butyl acrylate, 0.2 kg. of butanol and 0.15 kg. of residual oil. This solution is discharged through valve 39. From column 5 5.05 cubic meters (N.T.P.) per hour of a gas mixture of carbon monoxide and acetylene pass to condenser 7 through line 6 together with 3.6 kg. of vaporous acetone and 1.13 kg. of vaporous butanol. These vapors, after condensation, form liquid 8. Of this liquid 0.9 kg./h. of acetone and 0.28 kg./h. of butanol are refluxed into column 5 through preheater 18, while 2.7 kg./h. of acetone and 0.85 kg./h. of butanol flow back into the reaction chamber 2 through line 38.

It is undertsood that the foregoing examples are by way of illustration only, and not of limitation. Our invention can also be used for many other problems in the art of separating multi-component materials, including gases, liquids and solids. There is no limitation in the range of materials handled. Thus our invention can be applied to the separation of any substance in the field of organic and inorganic chemistry, provided this substance will pass into the gas phase in a sufficient, if very small, degree at the temperature used in the practice of each particular process. Without limitation thereto, the chemistry of carbon monoxide and of the substances related to olefins and acetylenes, more generally all processes in which liquid and suspended catalysts are used, furthermore the manufacture of intermediates, pharmaceuticals and odorants are the particular sections of organic chemistry in which the process in accordance with our invention can be used to special advantage.

The process in accordance with our invention allows of carrying out separations under especially mild conditions. It can therefore be used to special advantage, for example, in the isolation and purification of sensitive natural substances, such as pharmaceutically active substances, as for example alkaloids or odorants.

As an example of easily decomposable synthetic materials we have already described the recovery of metal carbonyls in a detailed manner with reference to Fig. 2. Another example of a separation of this type is the synthesis of carboxylic acids from olefin, carbon monoxide, and water, under the catalytic action of nickel carbonyl in which a crude product which contains the acid besides the olefin, water, and nickel carbonyl is obtained. By the method of this invention this crude product can be freed from the said by-products by contacting it in countercurrent flow with carbon monoxide under superatmospheric pressure. The presence of carbon monoxide in a high concentration prevents decomposition of the metal carbonyl into metal and carbon monoxide.

Furthermore, the process in accordance with our invention enables the low-temperature separation of mixtures containing substances which readily undergo polymerization and thus eliminates the necessity of using stabilizers. A detailed example of this particular embodiment of our invention is herein given with reference to Fig. 4.

Another embodiment of our invention is the concentration of acrylic acid from mixtures containing water and tetrahydrofuran by contacting a low percentage mixture of the acid with nitrogen in countercurrent flow, the readily volatile constituents water and tetrahydrofuran being discharged with the nitrogen in vapor form free of acrylic acid, while the highly concentrated acid is withdrawn in liquid form.

From this latter example as also from the example given for the separation of nickel carbonyl from carboxylic acids it appears that the process in accordance with our invention is by no means confined to being carried out in direct conjunction with a chemical reaction. On the contrary, it is a universally applicable process for the separation of materials, i.e. mixtures of any origin.

We claim:

1. In a carbonylation reaction between reactants consisting essentially of carbon monoxide, water and a gaseous hydrocarbon selected from the group consisting of olefins and acetylene in a liquid solvent mixture and in the presence of a metal carbonyl, the improved process for separating the vaporizable product of said carbonylation reaction from other vaporizable components of the liquid reaction mixture which comprises: contacting said liquid reaction mixture with carbon monoxide as a non-condensable carrier gas to entrain vapors of said vaporizable components at a temperature below the boiling point of said liquid reaction mixture; countercurrently contacting said carbon monoxide containing said entrained components with condensate therefrom for fractional exchange of said components therebetween; withdrawing liquid and vapor fractions from the zone of said countercurrent contacting wherein one of said fractions is enriched in said reaction product; and condensing vapors from said carbon monoxide after said countercurrent contacting to form said condensate.

2. The improved process as claimed in claim 1 wherein the carbonylation reaction is an exothermic reaction carried out under superatmospheric pressure and the separation of the vaporizable components is carried out at about the same pressure as said reaction.

3. The process which comprises reacting carbon monoxide, water, and propylene in contact with iron pentacarbonyl and N-n-butylpyrrolidine to produce n-butanol in a liquid mixture, in an exothermic reaction under superatmospheric pressure in a reaction zone, entraining vapors of water, iron pentacarbonyl, N-n-butylpyrrolidine, and n-butanol in additional carbon monoxide and propylene supplied to said zone as a carrier gas, at a temperature below the boiling point of the liquid mixture and at about the reaction temperature, removing from said zone said carrier gas containing entrained vapor components and also containing reaction heat, countercurrently contacting said removed carrier gas containing said reaction heat with condensate therefrom for fractional exchange of said components therebetween at approximately the same superatmospheric pressure, withdrawing a liquid fraction enriched in N-n-butylpyrrolidine, withdrawing a vapor fraction enriched in iron pentacarbonyl and n-butanol with said carrier gas, condensing vapors from said carrier gas to form said condensate, separating a fraction enriched in iron pentacarbonyl from said condensate, and returning said fractions enriched in N-n-butylpyrrolidine and iron pentacarbonyl to said reaction zone.

4. The process defined in claim 3 wherein said carrier gas is recycled to said reaction zone after said condensation of vapors therefrom.

5. The process which comprises reacting carbon monoxide, acetylene, and butanol to produce the butanol ester of acrylic acid in a liquid solvent mixture, in an exothermic reaction under superatmospheric pressure in a reaction zone, entraining vapors of butanol and said ester in additional carbon monoxide and acetylene supplied to said zone as a carrier gas, at a temperature below the boiling point of said mixture, removing from said zone said carrier gas containing said entrained vapor components and also containing reaction heat, countercurrently contacting said removed carrier gas containing said reaction heat with condensate therefrom for fractional exchange of said components therebetween at approximately the same superatmospheric pressure, withdrawing a liquid enriched in said butanol ester, withdrawing a vapor fraction enriched in said butanol, and condensing vapors from said carrier gas after said countercurrent contacting to form said condensate.

References Cited in the file of this patent

UNITED STATES PATENTS

| | | |
|---|---|---|
| 1,796,690 | Hermann et al. | Mar. 17, 1931 |
| 2,290,957 | Hachmuth | July 28, 1942 |
| 2,313,196 | Guinot | Mar. 9, 1943 |
| 2,452,797 | Smith | Nov. 2, 1948 |
| 2,486,980 | Robinson | Nov. 1, 1949 |
| 2,685,941 | Kassel | Aug. 10, 1954 |
| 2,765,872 | Hartman et al. | Oct. 9, 1956 |
| 2,779,778 | Mungen | Jan. 29, 1957 |
| 2,807,652 | Carrier | Sept. 24, 1957 |
| 2,840,513 | Nathan | June 24, 1958 |

OTHER REFERENCES

Vogel: "Practical Organic Chemistry," Longmans, N.Y., 1948, pp. 12–16.